Aug. 2, 1966  A. J. WHITE  3,263,503
INDICATING INSTRUMENT FOR A MOTOR
Filed April 13, 1964  2 Sheets-Sheet 1
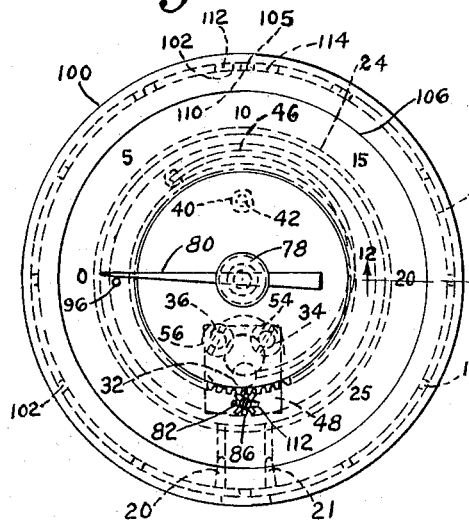
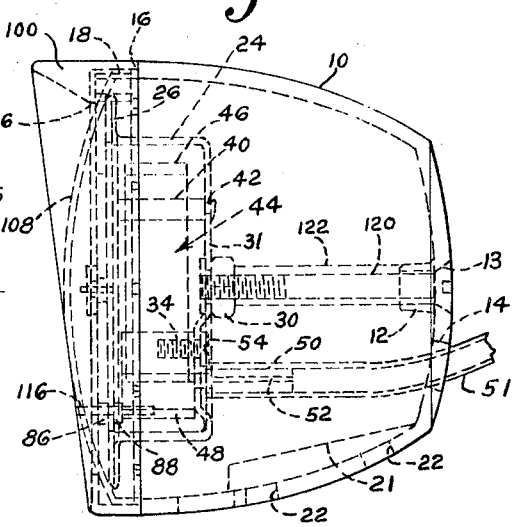
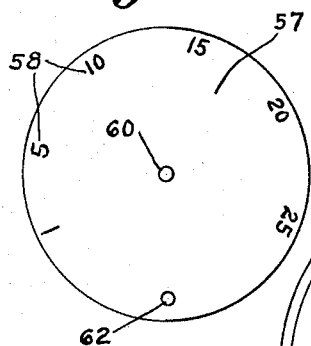
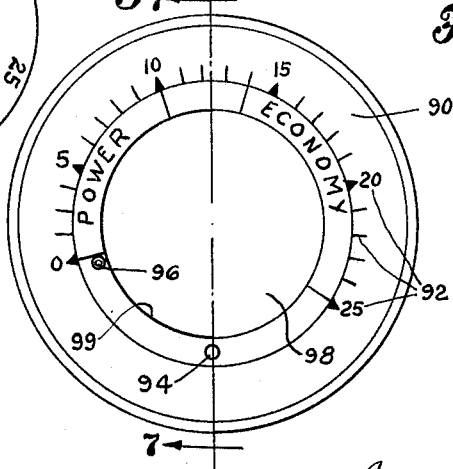
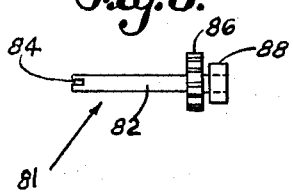
INVENTOR.
Andrew J. White
BY Harold E. Cole
Attorney Aug. 2, 1966 A. J. WHITE 3,263,503
INDICATING INSTRUMENT FOR A MOTOR
Filed April 13, 1964 2 Sheets-Sheet 2
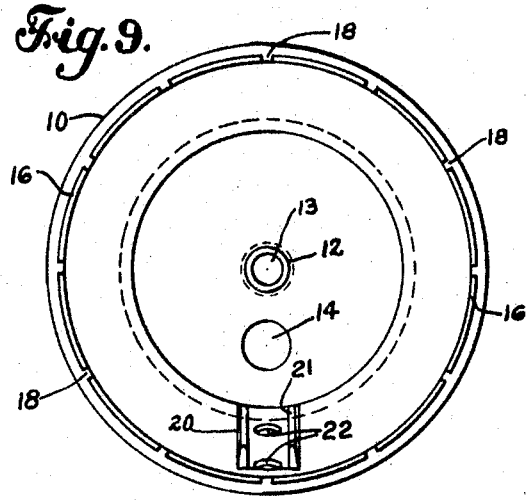
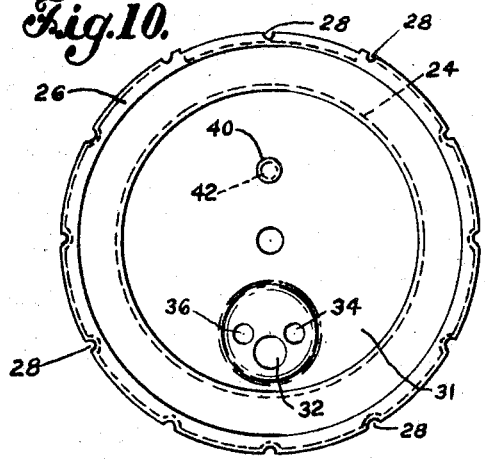
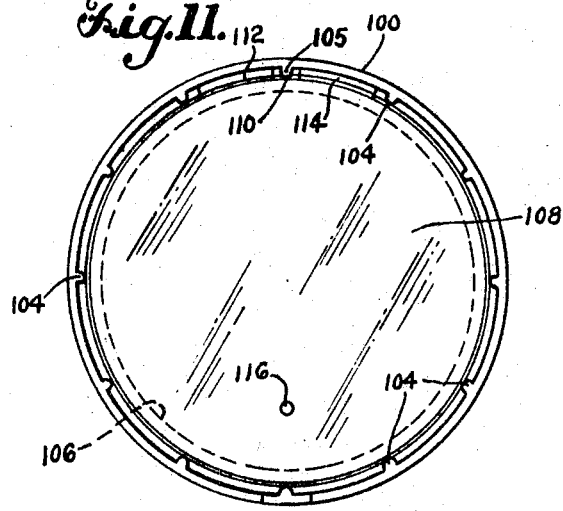
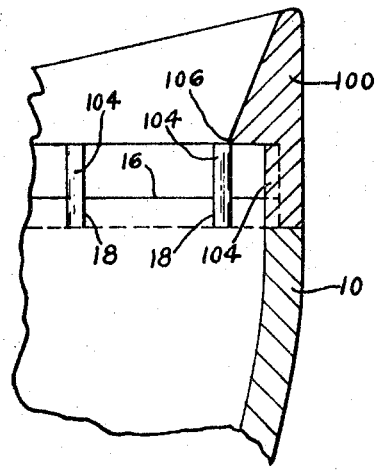
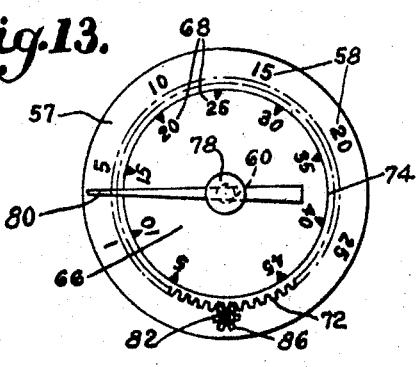
INVENTOR
Andrew J. White
BY Harold E. Cole
Attorney United States Patent Office 3,263,503
Patented August 2, 1966

3,263,503
INDICATING INSTRUMENT FOR A MOTOR
Andrew J. White, Lee, N.H.
(Newmarket P.O., South Lee, N.H.)
Filed Apr. 13, 1964, Ser. No. 359,141
6 Claims. (Cl. 73—431)

This invention relates to an indicating instrument, especially one that indicates vacuum conditions in the intake manifold of an internal combustion motor.

One object of my invention is to provide such an instrument that, when mounted on an automobile or other vehicle, provides two sets of indicia on two separate dials, one of which indicates the operating condition of the motor connected thereto, while the other indicates the approximate mileage obtained from consumption of fuel under varying conditions while traveling along.

Another object is to provide such an instrument with adjusting means whereby the position of one indicator dial relative to another and different one may be changed, thus making it possible to set one dial to any position that will enable it to more accurately reflect the efficiency of a motor connected thereto.

A further object is to provide a cover for the outer casing of my instrument on which cover the principal mechanism is mounted, and which may easily be connected to the casing, and yet easily disconnected and its position on the casing changed.

A still further object is to provide parts that form such an instrument that are simple and certain to assemble and in operation, and can be manufactured in quantities and at economical cost.

The foregoing and other objects which will appear as the nature of the invention is better understood, may be accomplished by a construction, combination and arrangements of parts such as is disclosed by the drawings. The nature of the invention is such as to render it susceptible to various changes and modifications, and, therefore, I am not to be limited to the construction disclosed by the drawings, nor to the particular parts described in the specification; but am entitled to all such changes therefrom as fall within the scope of my claims.

In the drawings:

FIG. 1 is a front elevational view of my instrument; but omitting the indicia on the inner dial, indicating gasoline consumption, for the sake of clearness.

FIG. 2 is a side elevational view of said instrument.

FIG. 3 is a plan view of the locating dial.

FIG. 4 is a plan view of the inner dial, including indicia thereon to indicate the rate of gasoline consumption.

FIG. 5 is a side elevational view of said inner dial.

FIG. 6 is a plan view of the outer dial.

FIG. 7 is a sectional view taken on the line 7—7 of FIG. 6.

FIG. 8 is a side elevational view of the adjusting member that connects with, and can move, said inner dial.

FIG. 9 is a front elevational view of the outer casing for my instrument.

FIG. 10 is a front elevational view of the holder for the vacuum responsive mechanism.

FIG. 11 is a rear elevational view of the cover with lens therein.

FIG. 12 is an enlarged, sectional view taken on the line 12—12 of FIG. 1.

FIG. 13 is a front elevational view of the inner dial assembled with the locating dial.

As illustrated, my instrument has a housing embodying an outer casing 10. An inner hollow neck 12 extends from the rear thereof and it commences with a countersunk hole 13 at the outside. Another hole 14 in said casing is offset from the center and later referred to.

At the front of said outer casing is a forwardly projecting rim 16 that has slots 18 therein that divide said rim into twelve spaced portions. At the interior of said casing is a pair of guides or ribs 20 and 21 extending longitudinally, and parallel to each other, to retain and prevent rotation of mounting nuts not shown, between which guides are two holes 22 to receive mounting bolts not shown.

An interior housing or holder 24 is saucer-shaped and has a front, outer rim or flange 26 in which indents 28 are made spaced apart. A nut 30 is fixed to said housing 24 at the back 31 thereof, and there is a hole 32 in the latter for a hose 51 to pass through, later referred to. There are also two holes 34 and 36 adjacent each other at the housing back. A forwardly projecting pin 40 serves as a stop member in assembling the parts, and it has a reduced end 42 that extends through the housing back 31 and is there peened over.

Set in said housing 24 is well-known vacuum responsive mechanism 44, not shown in detail, including a Bourdon tube 46 which responds in the usual way to changes of vacuum in a manifold for a motor when connected thereto. A mounting member 48 is attached to said tube 46. An intake tube 50 communicates with said Bourdon tube 46 and extends from the housing back 31 rearwardly, to which tube a hose 51 is connected, and it has an orifice 52 therethrough. Said hose extends through casing hole 14 to said manifold. Two screws 54 and 56 extend through said holes 34 and 36 respectively and connect in threaded holes in mounting member 48, thus attaching the mechanism 44 to said housing 24.

A locating dial 57 has indicia 58 on its face such as the numerals 5, 10, 15, etc. shown, and at the center is a hole 60, and near the periphery is another hole 62, later referred to. This dial 57 is not visible when the parts are assembled.

An inner dial 64 is smaller in diameter than dial 57 and forward thereof. It has a front face member 66 that has indicia 68 thereon which is intended to indicate the approximate consumption of gasoline per miles traveled, when it is calibrated with the primary or outer dial 90 later referred to. Said dial 64 has a central hole 70 therethrough. At the periphery of said dial 64 are gear teeth 72 which are formed slightly rearward or offset from said face 66 thereby providing a shoulder 74 at the outside edge of said dial face 66 later referred to. Said locating dial 57 is desirable for use in assembling said inner dial 64 since it serves as a guide to position the latter's indicia in approximately the correct position.

A shaft 78 extends through said center hole 60 in dial 57 and also through said hole 70 in dial 64 and it is rotatably and operably connected to said vacuum responsive mechanism 44. A pointer 80 is fixed on said shaft 78 and moves therewith in response to changes in vacuum conditions in said manifold.

An adjusting member 81 includes a pinion rod or shaft 82 having a slot 84 in its outside end to facilitate adjustment by rotative movement thereof as by a screw driver. A pinion 86 is fixed on said rod 82 at the inner end thereof which pinion is in mesh with said gear teeth 72 whereby any rotative movement of said pinion rotates said inner dial 64 to thus change the position of the indicia 68 relative to indicia 92 later referred to. A spacing collar 88 is rearwardly of said dial 57.

An outer or primary dial 90 is outside said dial 64 and is used as an indicator of vacuum conditions in the motor to which my instrument is connected. This dial 90 has indicia 92 thereon, which are the same numerals as appear on said locating dial 57, being in alinement therewith, hence the numerals on these two dials 57 and 90 would give the same reading. Thus said inner dial 64 may be positioned in approximately the correct position with relation to the indicia on dial 57, as well as dial 90, before the latter is assembled in position that covers dial 64.

The space directly between indicia 5 and 45 should be at the lowest part of said dial 64, as shown in said FIG. 13, since a single pointer 80 must serve both dials 64 and 90. The numerals on said latter two dials will not be in alinement with each other, however, since the position of said pointer 80 indicates on one set of indicia 92 the vacuum conditions in the intake manifold connected to my instrument, while the other set of indicia 68 indicates the approximate mileage per gallon of fuel consumed that the vehicle is obtaining under varying vacuum conditions.

Since the consumption of gasoline varies in different cars, calibration may be necessary. In this event said dial 64 will be moved slightly after my instrument is attached in place on a vehicle, by turning said adjusting rod 82 with a screw driver to thereby move the dial 64 to a predetermined position to give an approximately correct gasoline-mileage reading during travel. Of course, if it is known ahead the type and condition of the vehicle motor the instrument will be connected to, said dial 64 may be correctly set in advance by positioning it relative to the indicia 58 on said locating dial 57 alone as shown in said FIG. 13.

The outer dial 90 has a small hole 94 therethrough in alinement with said locating hole 62 so that both dials 57 and 90 will always be in the same predetermined position when said adjusting rod 82 extends therethrough. A stop member 96 is set in said dial 90 to prevent rotative movement of said pointer 80 beyond a predetermined point in any event.

Said outer dial 90 has a large central hole 98 so that the inner rim 99 thereof will fit around said shoulder 74 on said inner dial 64, resting on the face surface of the gear teeth 72.

I preferably provide said housing with an open cover 100 that also serves as a lens holder for lens 108 later referred to. This cover has a number of interior ribs or guide members 104 spaced apart the same distance as said indents 28 of housing 24 so that they may enter the latter by press fit when the cover 100 is assembled on the casing 10. Thus said cover 100 and housing 24 are attached. It also has another similar guide 105 later referred to. Said projecting rim portions 16 enter the spaces between said guide ribs 104. Said cover 100 also has an inner or lens retaining, projecting rim 106.

A transparent lens 108 rests against the inner surface of said rim 106 and it has inner rim portions 112 and 114 between which a slot 110 is formed to receive said guide member 105. A hole 116 in said lens is in alinement with said holes.

A long screw 120 extends through said neck 12, the head of which fits in said countersunk hole 13, and it screw-threadedly connects with said nut 30. A bushing 122 extends around said screw 120 between said neck 12 and said nut 30 to aid in positioning said screw.

To change the position of said dials 57 and 90, as for convenient reading in a vehicle, said cover 100 may be removed by loosening screw 120 and then rotating said cover, which is attached to said holder 24, to a different position with relation to said casing 10. The cover is then replaced by fitting guide ribs 104 between said casing slots 18 in the changed position, and tightening said screw.

What I claim is:

1. An indicating instrument comprising a housing, vacuum-responsive mechanism supported by said housing having an intake opening, an outer dial having indicia thereon adjacent the periphery thereof and having a central opening, a movable pointer rotatably mounted on said mechanism and extending towards said indicia and adapted to respond to actuation of said mechanism by rotative movement, said outer dial having an eccentrically located hole therethrough, an inner dial positioned in said central opening having indicia thereon adjacent the periphery thereof and having gear teeth at the periphery thereof, an adjusting member embodying a pinion in mesh with said gear teeth and an adjusting rod fixed to said pinion and extending through said eccentrically located hole whereby said rod may be actuated outside of said outer dial to thereby adjust the position of said inner dial.

2. An indicating instrument as set forth in claim 1, and having a cover for said housing, a lens member therein, said cover having an eccentrically located hole, said adjusting rod extending through said latter hole and forwardly beyond said lens.

3. An indicating instrument as set forth in claim 1 in which said inner dial has a face at the front thereof and said gear teeth are inwardly of and offset from said face to thereby provide a shoulder between the two, said outer dial embodying an inner rim defining said central opening that is positioned outside of and closely adjacent said shoulder, said outer dial being in contact with the face surface of said gear teeth.

4. An indicating instrument as set forth in claim 1 having a locating dial rearwardly of said inner dial having an eccentrically located hole therethrough alined with said first hole, said adjusting rod extending through both said holes, said inner dial having indicia thereon adjacent the periphery thereof and in alinement with said outer dial indicia.

5. An indicating instrument comprising a housing embodying an outer casing having a forwardly projecting circular rim having slots therein, a cover for said casing embodying interior guide members at its inner periphery extending into said rim slots, a holder mounted on said cover, vacuum-responsive mechanism attached to said holder and having an intake opening, a dial supported by said cover having indicia thereon adjacent the periphery thereof, and a movable pointer rotatably mounted on said mechanism and extending towards said indicia and adapted to respond to actuation of said mechanism by rotative movement.

6. An indicating instrument as set forth in claim 5 in which said holder has indents in its outer periphery and said cover guide members extend into said indents and firmly contact said holder outer periphery whereby said holder is attached to said cover.

References Cited by the Examiner

UNITED STATES PATENTS

| 1,181,566 | 5/1916 | Bowden | 73—114 |
| 2,362,393 | 11/1944 | Naida | 73—387 |
| 2,458,022 | 1/1949 | Phelps et al. | 73—178 X |
| 2,581,734 | 1/1952 | Triplett | 73—431 X |
| 2,701,969 | 2/1955 | Meredith | 73—431 |

FOREIGN PATENTS 1,081,055 12/1954 France.

RICHARD C. QUEISSER, *Primary Examiner.*

J. W. MYRACLE, *Assistant Examiner.*